United States Patent
Ho et al.

(10) Patent No.: US 11,716,116 B2
(45) Date of Patent: Aug. 1, 2023

(54) ANALOG ECHO CANCELATION METHOD

(71) Applicant: REALTEK SEMICONDUCTOR CORPORATION, Hsinchu (TW)

(72) Inventors: Hsuan-Ting Ho, Hsinchu (TW); Liang-Wei Huang, Hsinchu (TW); Po-Han Lin, Hsinchu (TW); Chia-Lin Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/711,491

(22) Filed: Apr. 1, 2022

(65) Prior Publication Data

US 2022/0321169 A1 Oct. 6, 2022

(30) Foreign Application Priority Data

Apr. 6, 2021 (TW) .................... 110112399

(51) Int. Cl.
*H04B 3/20* (2006.01)
*H04B 3/23* (2006.01)
*H04L 25/02* (2006.01)

(52) U.S. Cl.
CPC ........... *H04B 3/23* (2013.01); *H04L 25/0228* (2013.01)

(58) Field of Classification Search
CPC ......... H04B 3/23; H04B 3/20; H04L 25/0228; H04M 3/002; H04M 9/082; H04M 7/006
See application file for complete search history.

(56) References Cited

U.S. PATENT DOCUMENTS

| | | | | |
|---|---|---|---|---|
| 2002/0126855 A1* | 9/2002 | Terada | ................... | H04M 9/082 379/406.01 |
| 2004/0062386 A1* | 4/2004 | Tahernezhaadi | ....... | H04B 3/493 379/406.01 |
| 2008/0170515 A1* | 7/2008 | Masuda | ................ | H04M 9/082 370/286 |
| 2021/0367640 A1* | 11/2021 | Chen | ...................... | H04B 3/235 |

\* cited by examiner

*Primary Examiner* — Phuongchau Ba Nguyen
(74) *Attorney, Agent, or Firm* — WPAT, P.C., Intellectual Property Attorneys; Anthony King

(57) ABSTRACT

A method includes: generating a first signal according to a digital signal; filtering the first signal according to first filter coefficients of first filter to generate a second signal; adding a first reference signal with the second signal to generate a third signal; performing digital-to-analog conversion according to the first and third signals to generate and output an echo signal; performing analog-to-digital conversion according to the echo signal to generate a fourth signal; generating a fifth signal according to the digital signal and the fourth signal; and updating the first filter coefficients according to the fifth signal. Generating the fifth signal includes: generating second filter coefficients of second filter; updating the second filter coefficients according to a second reference signal and the fourth signal; obtaining a first and second representative coefficients of the second filter coefficients; and generating the fifth signal according to the first and second representative coefficients.

20 Claims, 2 Drawing Sheets

ANALOG ECHO CANCELATION METHOD

CROSS-REFERENCE TO RELATED APPLICATIONS

This application claims the benefit of priority to patent application Ser. No. 110112399, filed in Taiwan on Apr. 6, 2021, which is incorporated by reference in its entirety.

TECHNICAL FIELD

The present application relates to a communication method, in particular, to a communication method for analog echo cancellation.

BACKGROUND

In a full-duplex transmission device, when there is an impedance mismatch in the transmission line or a mismatch in the hybrid structure at the receiving end of the transmission device, the transmitting signal will leak back to the receiving end, thereby forming a near-end echo and a remote echo, which reduces the signal-to-noise ratio of the analog received signal. In this case, the near-end echo is usually much larger than the remote echo, and the near-end echo is related to the analog output signal of the transmission device itself. When the transmission device performs analog-to-digital conversion on the analog receiving signal, if the echo is too large, the dynamic range of the analog-to-digital converter at the receiving end will be partially occupied by the echo, thereby making the dynamic range of the analog-to-digital converter less usable. Therefore, it has become an important issue in this field to reduce the near-end echo efficiently without increasing the complexity and cost of the transmission device significantly.

SUMMARY OF THE INVENTION

An aspect of the present disclosure provide an analog echo cancellation method, including the following steps: generating a first signal according to a digital signal; filtering the first signal according to a plurality of first filter coefficients of a first filter to generate a second signal; adding a first reference signal with the second signal to generate a third signal; performing digital-to-analog conversion according to the first signal and the third signal to generate and output an analog echo signal; performing analog-to-digital conversion according to the analog echo signal to generate a fourth signal; generating a fifth signal according to the digital signal and the fourth signal; and updating the plurality of first filter coefficients according to the fifth signal. The step of generating the fifth signal according to the digital signal and the fourth signal includes: generating a plurality of second filter coefficients of a second filter; updating the plurality of second filter coefficients of the second filter according to a second reference signal and the fourth signal; obtaining a first representative coefficient and a second representative coefficient of the plurality of second filter coefficients; and generating the fifth signal according to the first representative coefficient and the second representative coefficient.

The analog echo cancellation method of the present disclosure uses delayed least mean square (delayed LMS) algorithm to reduce the near-end echo and increase the signal-to-noise ratio of the received signal to maintain the dynamic range that the analog digital converters can effectively use. It has a lower cost compared to known techniques.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
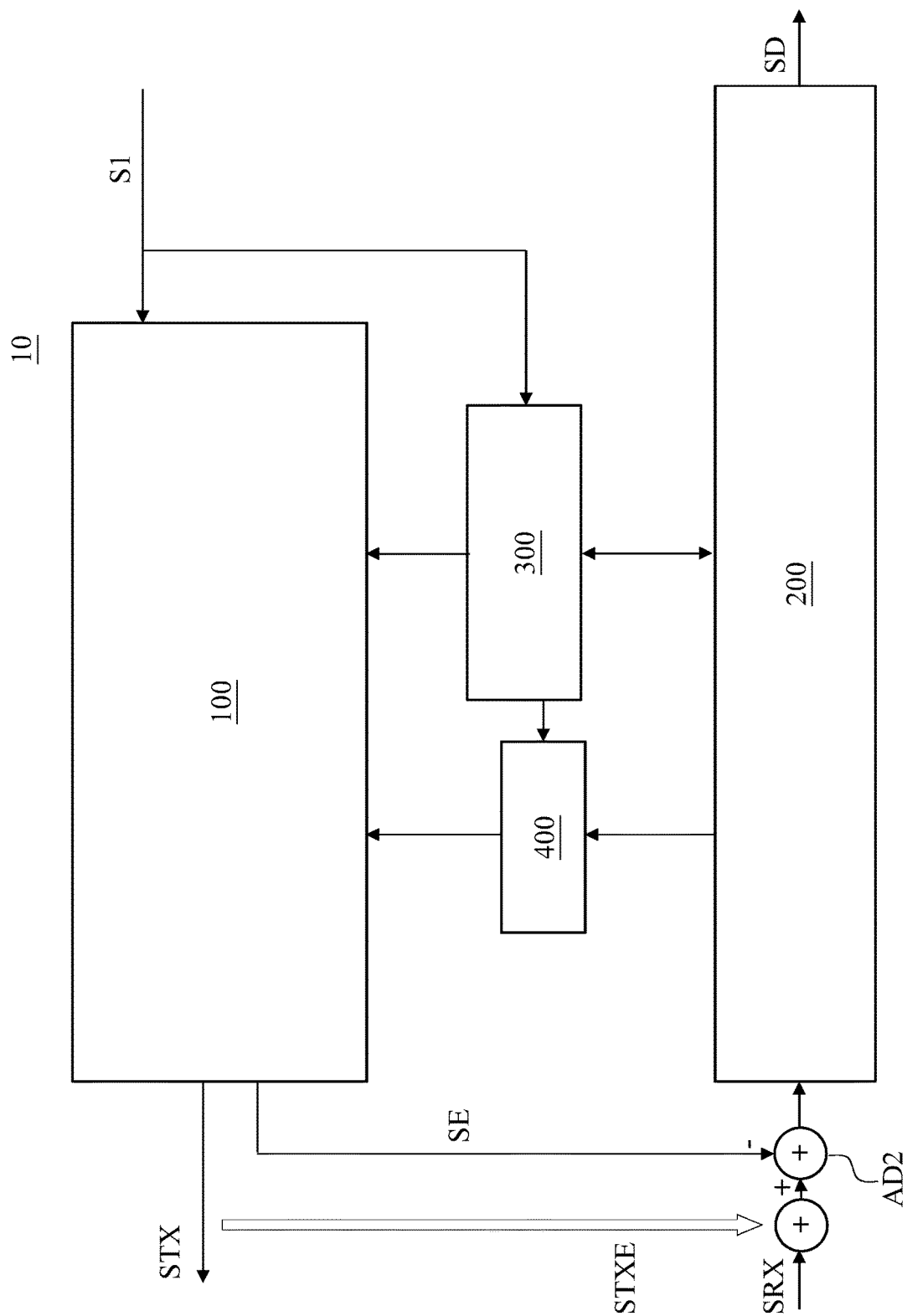
FIG. 1 is a schematic diagram illustrating a transmission device according to some embodiments of the present application.

FIG. 1 is a schematic diagram illustrating a transmission device 10 according to some embodiments of the present application. The transmission device 10 implements the full-duplex technology; for example, the transmission device 10 transmits and receives the signal via two transmission lines, wherein the first transmission line is configured to output an analog output signal STX, and the second transmission line is configured to receive an analog input signal SRX. In some embodiments, the transmission device 10 is used in an Ethernet system.

As shown in FIG. 1, the transmission device 10 includes a transmission circuit 100, a receiving circuit 200, an echo cancellation circuit 300, and a processing circuit 400. The transmission circuit 100 is coupled to the receiving circuit 200, the echo cancellation circuit 300, and the processing circuit 400. The receiving circuit 200 is coupled to the echo cancellation circuit 300 and the processing circuit 400. The echo cancellation circuit 300 are further coupled to the processing circuit 400.

The transmission circuit 100 receives a digital signal S1 and performs digital-to-analog conversion to generate the analog output signal STX, which is outputted from the first transmission line. In some embodiments, the digital signal S1 is a signal that is generated after being encoded by a media access control layer (MAC layer); however, the present application is not limited thereto. In addition to receiving the analog input signal SRX, the second transmission line near the transmission circuit 100 will also receive an analog echo signal STXE due to impedance mismatch and is received by the receiving circuit 200, so that the receiving circuit 200 actually receives the result of superimposing the analog input signal SRX and the analog echo signal STXE. Therefore, the transmission circuit 100 generates an echo cancellation signal SE to cancel the analog echo signal STXE. The receive circuit 200 is also configured to perform analog-to-digital conversion to generate a signal SD.

The echo cancellation circuit 300 and the processing circuit 400 reduces the analog echo signal STXE in the second transmission line according to the signal S1, so that the signal received by the receiving circuit 200 may have a higher signal-to-noise ratio (SNR). Because the signal processed by the receiving circuit 200 includes the analog input signal SRX and the analog echo signal STXE, when performing the analog-to-digital conversion, the effective dynamic range of the analog-to-digital converter (ADC) is related to the analog echo signal STXE. The dynamic range can be expressed in the effective number of bits (ENOB). The weaker analog echo signals STXE, the greater effective dynamic range, whereas stronger analog echo signals STXE, the less dynamic range.

To enable the receiving circuit 200 to use the full dynamic range when performing the analog-to-digital conversion, the transmission device 10 of the present application reduces the analog echo signal STXE before it enters the receiving circuit 200 by using the echo canceling signal SE, which not only increases SNR but also increases ENOB. The details are discussed below.

Figure 2:
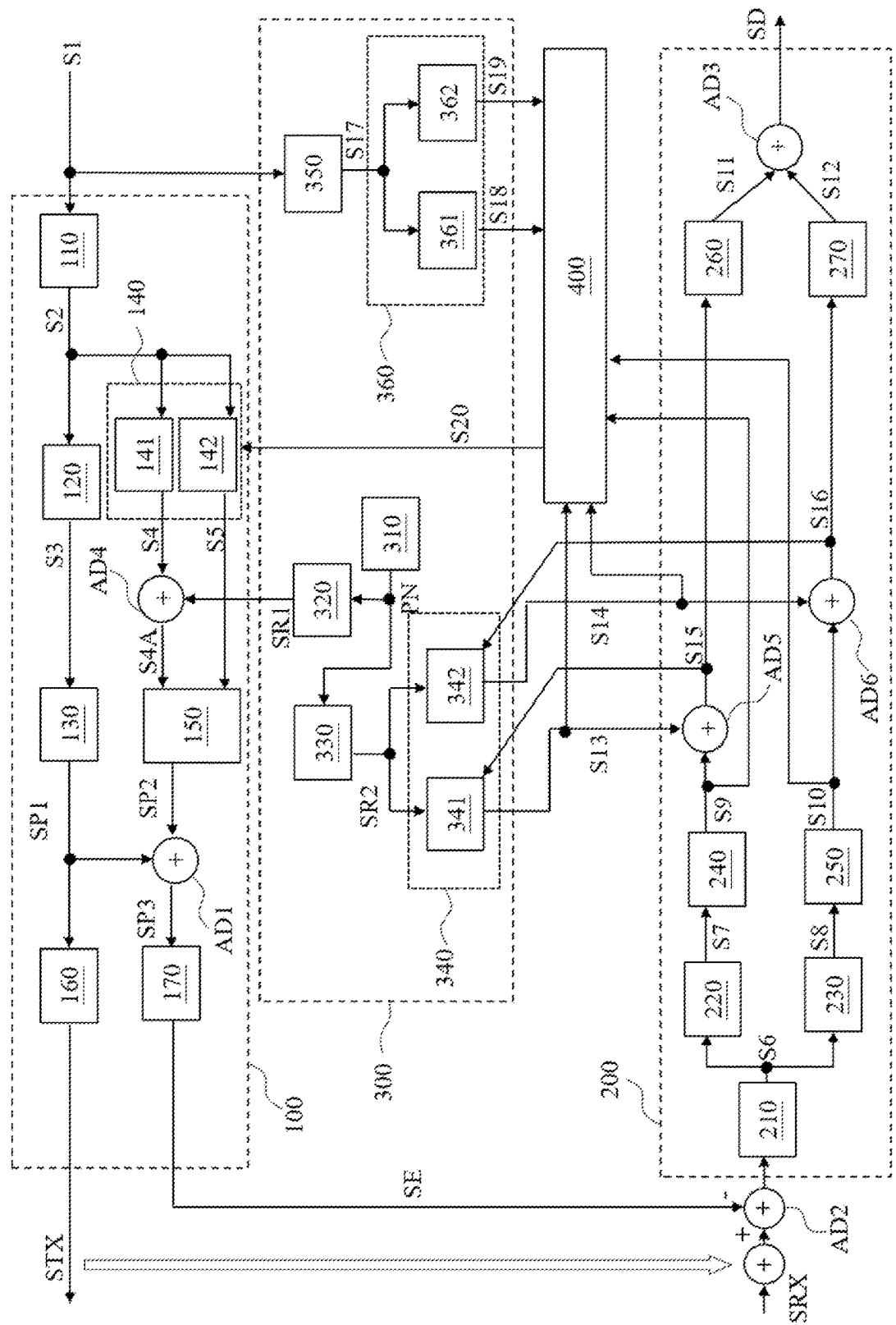
FIG. 2 is a partial detailed schematic diagram illustrating the transmission device according to some embodiments of the present application.

Reference is made to FIG. 2. FIG. 2 is a partial detailed schematic diagram illustrating the transmission device 10 according to some embodiments of the present application.

The transmission circuit 100 includes a memory 110, an oversampling circuit 120, a shaping circuit 130, a filtering device 140, a shaping circuit 150, a digital-to-analog converter (DAC) 160, and a DAC 170.

In some embodiments, the memory 110 is implemented as a register capable of executing a first-in-first-out (FIFO) program; for example, the memory 110 is implemented as a non-synchronous FIFO register. The memory 110 is configured to receive the signal S1 in a first time domain SYSC and generate a signal S2 in a second time domain TXC. The oversampling circuit 120 is configured to oversample the signal S2 and generate a signal S3. In some embodiments, the frequency of the signal S2 is 400 MHz, and the frequency of the signal S3 is 1.6 GHz. The shaping circuit 130 generates a shaped signal SP1 based on the signal S3. Then, the ADC 160 performs a digital-to-analog conversion on the shaped signal SP1 to generate the analog output signal STX.

The filtering device 140 includes a filter 141 and a filter 142. In some embodiments, the filter 141 and the filter 142 are finite impulse filters (FIR), which have a plurality of filter coefficients, respectively, wherein the filter coefficients show the filter's response to the signal. When the filter coefficients are changed, the filtering results of the filter to the signal are also changed. The filtering device 140 has an array of filter coefficients, wherein the filter coefficients of the filtering device 140 include the filter coefficients of the filter 141 and the filter 142. More specifically, the filter coefficients of the filter 141 and the filter coefficients of the filter 142 are the odd-digit filter coefficients and even-digit filter coefficients of the filtering device 140, respectively. The filter 141 and the filter 142 each have a plurality of taps, where the number of taps is equal to the number of filter coefficients. For example, each of the filter 141 and the filter 142 has 12 filter coefficients and 12 taps forming an array. The filter 141 and the filter 142 filter the signal S2 according to the filter coefficients to generate a signal S4 and a signal S5, respectively, and the filter 141 and the filter 142 filter the signal S2 using the least mean square (LMS) algorithm through the echo cancellation circuit 300 and the processing circuit 400, details of which are described below. The shaping circuit 150 generates a shaped signal SP2 based on the signal S4 and the signal S5, and then adds the shaped signal SP1 and the shaped signal SP2 together by using an adder AD1 to generate a shaped signal SP3 and performs a digital-to-analog conversion on the shaped signal SP3 by using the DAC 170 to generate an echo cancellation signal SE for outputting.

The receiving circuit 200 includes a front circuit 210, an ADC 220, an ADC 230, a memory 240, a memory 250, a filter 260, and a filter 270. The front circuit 210 is coupled to the ADC 220 and the ADC 230, the ADC 220 and the ADC 230 are respectively coupled to the memory 240 and the memory 250, and the memory 240 and the memory 250 are respectively coupled to the filter 260 and the filter 270.

After superimposing the analog input signal SRX and the analog echo signal STXE, an adder AD2 is used to deduct by the echo cancellation signal SE, and the resulting signal is received by the front circuit 210 to generate a signal S6. The ADC 220 and the ADC 230 perform the analog-to-digital conversion on the signal S6 to generate a signal S7 and a signal S8 in a third time domain RXC, respectively. In some embodiments, the memory 240 and the memory 250 are implemented by using non-synchronous FIFO registers. The memory 240 and the memory 250 are configured to receive the signal S7 and the signal S8 in the third time domain RXC, respectively, and generate a signal S9 and a signal S10 in the first time domain SYSC. Next, the filter 260 and the filter 270 filter the signal S9 and the signal S10, respectively, to generate a signal S11 and a signal S12. Next, an adder AD3 is used to sum up the signal S11 and the signal S12 to generate a signal SD.

The echo cancellation circuit 300 includes a pseudo-random number generator 310, a memory 320, a memory device 330, a filtering device 340, a memory 350, and a filtering device 360. The pseudo-random number generator 310 is coupled to the memory 320 and the memory device 330, the memory 320 is coupled to the transmission circuit 100, the memory device 330 is coupled to the filtering device 340, the filtering device 340 is coupled to the receiving circuit 200 and the processing circuit 400, the memory 350 is coupled to the transmission circuit 100 and the filtering device 360, and the filtering device 360 is coupled to the processing circuit 400.

The echo cancellation circuit 300 generates a reference signal PN by the pseudo-random number generator 310 and uses the memory 320 to receive the reference signal PN to generate a reference signal SR1, which is transferred to the transmission circuit 100. In some embodiments, the reference signal PN is a pseudo-random number signal. In some embodiments, the memory 320 is implemented as a non-synchronous FIFO register. The memory 320 receives the reference signal PN in the first time domain SYSC and generates the reference signal SR1 in the second time domain TXC. In the transmission circuit 100, an adder AD4 is used to sum up the reference signal SR1 and the signal S4 to generate a signal S4A, and then the shaping circuit 150 shapes the signal S4A and signal the S5 to generate the shaped signal SP2. Therefore, the echo cancellation signal SE generated by the transmission circuit 100 includes information related to the reference signal PN, and consequently, the signal S9 and the signal S10 generated in the receiving circuit 200 also include information related to the reference signal PN.

The reference signal PN generated by the pseudo-random number generator 310 is further received by the memory device 330, and a reference signal SR2 is generated by the memory device 330 to the filtering device 340. In some embodiments, the memory device 330 includes a dynamic FIFO register. The memory device 330 is configured to receive the reference signal PN in the first time domain SYSC and reverse the phase of the reference signal PN to generate the reference signal SR2 in the first time domain SYSC. In other words, the reference signal PN and the reference signal SR2 have opposite signs. The filtering device 340 includes a filter 341 and a filter 342. In some embodiments, the filter 341 and the filter 342 are FIRs. The filter 341 and the filter 342 filter the reference signal SR2 according to their own filter coefficients to respectively generate a signal S13 and a signal S14, and then transfer the signal S13 and the signal S14 to the receiving circuit 200. In the receiving circuit 200, an adder AD5 is used to sum up the signal S9 and the signal S13 to generate a signal S15 and transfers the same to the filter 260, and then an adder AD6 is used to sum up the signal S10 and the signal S14 to generate a signal S16 and then transfers the same to the filter 270.

After the echo cancellation circuit 300 transfers the reference signal SR1 to the transmission circuit 100 to generate the echo cancellation signal SE, the signal received by the receiving circuit 200 includes the information about the reference signal SR1. However, the reference signal SR1 does not belong to the content in the analog input signal SRX, and hence the echo cancellation circuit 300 needs to further transfer the signal S13 and the signal S14 that include the information of the reference signal SR2 to the receiving circuit 200. In this way, after the receiving circuit 200 receives the content of information that includes the reference signal SR1, the information related to the reference signal SR1 can be canceled by using the signal S13 and the signal S14 including the information of the reference signal SR2 (which is in the opposite phase of the reference signal SR1).

In some embodiments, the phase shift of the reference signal SR1 transferred to the receiving circuit 200 via the transmission circuit 100 is different from the phase shift of the reference signal SR2 transferred to the receiving circuit 200 via the filtering device 340, and hence, there is a phase difference between the information related to the reference signal SR1 and the information related to the reference signal SR2 at the adder AD5 and the adder AD6. The above phase difference can be ascertained by the generated signal S15 and the signal S16. In order to adjust the phase of the information included in the signals S9, S10 and signals S13, S14 that is related to the reference signal SR1 and the reference signal SR2 to be the same phase, the filter 341 and the filter 342 adjust the filter coefficient using the signal S15 and the signal S16, respectively.

The echo cancellation circuit 300 receives the signal S1 via the memory 350 and generates a signal S17; then, the filtering device 360 filters the signal S17. In some embodiments, the signal S1 is the same as the signal S17. The filtering device 360 includes a filter 361 and a filter 362. In some embodiments, the filter 361 and the filter 362 are FIRs, and the filter 361 and the filter 362 filter the signal S17 according to the filter coefficients to respectively generate a signal S18 and a signal S19 and transfer the same to the processing circuit 400.

In some embodiments, the filtering device 340 and the filtering device 360 respectively have an array of filter coefficients, wherein the filter coefficients of the filtering device 340 include the filter coefficients of the filter 341 and the filter 342, and the filter coefficients of the filtering device 360 include the filter coefficients of the filter 361 and the filter 362. More specifically, the filter coefficients of the filter 341 and the filter coefficients of the filter 342 are the odd-digit filter coefficients and the even-digit filter coefficients of the filtering device 340, respectively, and the filter coefficients of the filter 361 and the filter coefficients of the filter 362 are the odd-digit filter coefficients and the even-digit filter coefficients of the filtering device 360, respectively.

The processing circuit 400 is configured to generate a signal S20 according to the signal S1, the signal S9, and the signal S10, and transmit the same to the transmission circuit 100. Then, the transmission circuit 100 updates the filter coefficients of the filtering device 140 according to the signal S20. In the present embodiment, the processing circuit 400 uses the Delayed LMS algorithm of the LMS algorithms to generate the signal S20 so that the filtering device 140 may filter the signal S2 using the Delayed LMS mechanism.

In some embodiments, the processing circuit 400 has two types of algorithms to achieve the effect of the Delayed LMS algorithm. More specifically, the processing circuit 400 uses one of the two algorithms to determine filter coefficients of the filtering device 360 according to filter coefficients of the filtering device 340. After determining the filter coefficients of the filtering device 360, the processing circuit 400 generates the signal S20 according to the signal S9, the signal S10, the signal S18, and the signal S19. Details of the two algorithms are discussed below.

The processing circuit 400 obtains absolute values of the filter coefficients of the filtering device 340 and obtains a first representative coefficient having a maximum value therein. Then, a filter coefficient preceding the first representative coefficient is compared with a filter coefficient succeeding the first representative coefficient. If the absolute value of the preceding filter coefficient is greater than or equal to the absolute value of the succeeding filter coefficient, the processing circuit 400 sets the preceding filter coefficient as the second representative coefficient. If the absolute value of the preceding filter coefficient is less than the absolute value of the succeeding filter coefficient, the processing circuit 400 sets the succeeding filter coefficient as the second representative coefficient.

In the first algorithm, after determining the first representative coefficient and the second representative coefficient of the filter coefficients of the filtering device 340, the processing circuit 400 determines weights of the first representative coefficient and the second representative coefficient according to a predetermined first reference value and second reference value. In some embodiments, the first reference value and the second reference value are related to the manufacturing parameters of the filtering device 340, wherein the first reference value is greater than the second reference value; for example, the first reference value is 0.93 and the second reference value is 0.73.

When the absolute value of the second representative coefficient is greater than a product of the absolute value of the first representative coefficient multiplied by the first reference value, the processing circuit 400 determines that the second representative coefficient has a greater weight and sets the value of the filter coefficient of the filter device 360 corresponding to the second representative coefficient of the filter device 340 to the value of the second representative coefficient, and sets the remaining filter coefficients to 0.

When the absolute value of the second representative coefficient is less than a product of the absolute value of the first representative coefficient multiplied by the second reference value, the processing circuit 400 determines that the first representative coefficient has a greater weight and sets the value of the filter coefficient of the filter device 360 corresponding to the first representative coefficient of the filter device 340 to the value of the first representative coefficient, and sets the remaining filter coefficients to 0.

When the absolute value of the second representative coefficient is less than the product of the absolute value of the first representative coefficient multiplied by the first reference value and is greater than or equal to the product of the absolute value of the first representative coefficient multiplied by the second reference value, the processing circuit 400 determines that the first representative coefficient and the second representative coefficient have the same weight, and sets the values of the filter coefficients of the filter device 360 corresponding to the first representative coefficient and the second representative coefficient of the filter device 340 to the values of the first representative coefficient and the second representative coefficient, respectively, and sets the remaining filter coefficients to 0.

In the second algorithm, the processing circuit 400 respectively sums up a sum of the filter coefficients of the filter 341 and a sum of the filter coefficients of the filter 342, respectively, to obtain an odd-digit sum and an even-digit sum, and then subtracts the odd-digit sum from the even-digit sum to obtain an odd-even difference. The processing circuit 400 then sums up the absolute value of filter coefficients of the filtering device 340 to obtain an absolute sum. After obtaining the odd-even difference and the absolute sum, the processing circuit 400 determines the weights of the first representative coefficient and the second representative coefficient according to a third reference value and a fourth reference value. In this case, the third reference value is equal to the fourth reference value multiplied by −1. For example, the third reference value is $1/32$, and the fourth reference value is $-1/32$.

When the odd-even difference is greater than a product of the absolute sum multiplied by the third reference value, the processing circuit 400 determines that the filter coefficients of the filter 341 have a greater weight. The processing circuit 400 selects one of the first representative coefficient and the second representative coefficient which is an odd-digit filter coefficient in the filter coefficients of the filtering device 340, and determines that the odd-digit first representative coefficient or second representative coefficient has a greater weight. When the first representative coefficient is at an odd-digit position, the processing circuit 400 sets a value of the filter coefficients of the filter device 360 corresponding to the first representative coefficient of the filter device 340 to the value of the first representative coefficient and sets the values of the remaining filter coefficients to 0. When the second representative coefficient is at an odd-digit position, the processing circuit 400 sets a value of the filter coefficients of the filter device 360 corresponding to the second representative coefficient of the filter device 340 to the value of the second representative coefficient and sets the values of the remaining filter coefficients to 0.

When the odd-even difference is less than the product of the absolute sum multiplied by the fourth reference value, the processing circuit 400 determines that the filter coefficients of the filter 342 have a greater weight. The processing circuit 400 selects one of the first representative coefficient and the second representative coefficient which is an even-digit filter coefficient in the filter coefficients of the filtering device 340, and determines that the even-digit first representative coefficient or second representative coefficient has a greater weight. When the first representative coefficient is at an even-digit position, the processing circuit 400 sets a value of the filter coefficient of the filter device 360 corresponding to the first representative coefficient of the filter device 340 to the value of the first representative coefficient and sets the values of the remaining filter coefficients to 0. When the second representative coefficient is at an even-digit position, the processing circuit 400 sets a value of the filter coefficient of the filter device 360 corresponding to the second representative coefficient of the filter device 340 to the value of the second representative coefficient and sets the values of the remaining filter coefficients to 0.

When the odd-even difference is greater than or equal to the absolute sum multiplied by the fourth reference value and is less than or equal to the absolute sum multiplied by the third reference value, the processing circuit 400 determines that the filter coefficients of the filter 341 and the filter 342 have the same weight, and sets the values of the filter coefficients of the filter device 360 corresponding to the first representative coefficient and the second representative coefficient of the filter device 340 to the values of the first representative coefficient and the second representative coefficient, and sets the values of the remaining filter coefficients to 0.

After the filter coefficients of the filtering device 360 are determined according to the first algorithm or second algorithm, the filtering device 360 filters the signal S17 according to the thus-determines filter coefficients to generate the signal S18 and the signal S19. The processing circuit 400 then multiplies the signal S9 by the signal S18 and multiplies the signal S10 by the signal S19 to obtain the signal S20 accordingly.

After updating the filter coefficients of the filtering device 140, the transmission circuit 100 can adjust the echo cancellation signal SE accordingly to reduce the analog echo signal STXE.

The conventional technology spends a lot of computing cost to use the LMS algorithm to update the filter coefficients of the filter. However, in the transmission device 10 according to the present application, the power consumption required when multiplying signals is reduced significantly while the echo cancellation effect would not be jeopardized significantly. Most of the filter coefficients of the filtering device 360 are set as 0.

The foregoing disclosure briefly sets forth the features of certain embodiments of the present application so that persons with ordinary skill in the art can more fully understand various aspects of the present application. It would be apparent to those with ordinary skill in the art that they can easily use the present application as a basis for designing or modifying other manufacturing processes and structures to achieve the same purpose and/or achieve the same advantages as the present application does. Those skilled in the art should understand that these equivalent implementations are still within the spirit and scope of the present application and that they may be subject to various variations, substitutions, and modifications without departing from the spirit and scope of the present application.

What is claimed is:
1. A method, comprising:
  generating a first signal according to a digital signal;
  filtering the first signal according to a plurality of first filter coefficients of a first filter to generate a second signal;
  adding a first reference signal with the second signal to generate a third signal;
  performing digital-to-analog conversion according to the first signal and the third signal to generate and output an analog echo signal;
  performing analog-to-digital conversion according to the analog echo signal to generate a fourth signal;
  generating a fifth signal according to the digital signal and the fourth signal, comprising:
    generating a plurality of second filter coefficients of a second filter;
    updating the plurality of second filter coefficients of the second filter according to a second reference signal and the fourth signal;
    obtaining a first representative coefficient and a second representative coefficient of the plurality of second filter coefficients; and generating the fifth signal according to the first representative coefficient and the second representative coefficient; and
updating the plurality of first filter coefficients according to the fifth signal.

2. The method of claim 1, wherein the step of updating the plurality of second filter coefficients of the second filter according to the second reference signal and the fourth signal comprises:
filtering the second reference signal according to the plurality of second filter coefficients of the second filter to generate a sixth signal, wherein the second reference signal and the first reference signal are inverted to each other;
adding the sixth signal with the fourth signal to generate a seventh signal; and
updating the plurality of second filter coefficients according to the seventh signal.

3. The method of claim 2, wherein the step of generating the fifth signal according to the first representative coefficient and the second representative coefficient comprises:
generating a plurality of third filter coefficients of a third filter according to the first representative coefficient and the second representative coefficient;
filtering the digital signal according to the plurality of third filter coefficients of the third filter to generate an eighth signal; and
multiplying the fourth signal by the eighth signal to generate the fifth signal.

4. The method of claim 3, wherein the step of obtaining the first representative coefficient and the second representative coefficient of the plurality of second filter coefficients comprises:
comparing a preceding coefficient preceding the first representative coefficient and a succeeding coefficient succeeding the first representative coefficient, wherein when the absolute value of the preceding coefficient is greater than the absolute value of the succeeding coefficient, the preceding coefficient is the second representative coefficient, when the absolute value of the preceding coefficient is less than the absolute value of the succeeding coefficient, the succeeding coefficient is the second representative coefficient, and when the absolute value of the preceding coefficient equals to the absolute value of the succeeding coefficient, the preceding coefficient is the second representative coefficient,
wherein the first representative coefficient is a coefficient having the greatest absolute value of the plurality of second filter coefficients.

5. The method of claim 4, wherein the step of generating the plurality of third filter coefficients of the third filter according to the first representative coefficient and the second representative coefficient comprises:
comparing the absolute value of the second representative coefficient, a product of the absolute value of the first representative coefficient multiplied by a first reference value, and a product of the absolute value of the first representative coefficient multiplied by a second reference value, wherein the first reference value is greater than the second reference value.

6. The method of claim 5, wherein when the absolute value of the second representative coefficient is greater than the product of the absolute value of the first representative coefficient multiplied by the second reference value and is less than the product of the absolute value of the first representative coefficient multiplied by the first reference value, the step of generating the plurality of third filter coefficients of the third filter according to the first representative coefficient and the second representative coefficient further comprises:
setting the two corresponding coefficients of the plurality of third filter coefficients as the first representative coefficient and the second representative coefficient, wherein positions of the first representative coefficient and the second representative coefficient in the plurality of second filter coefficients are the same as positions of the determined first representative coefficient and the determined second representative coefficient in the plurality of third filter coefficients; and
setting the plurality of third filter coefficients other than the determined first representative coefficient and the second determined representative coefficient in the plurality of third filter coefficients as 0.

7. The method of claim 5, wherein when the absolute value of the second representative coefficient is less than the product of the absolute value of the first representative coefficient multiplied by the second reference value, the step of generating the plurality of third filter coefficients of the third filter according to the first representative coefficient and the second representative coefficient further comprises:
setting the corresponding coefficient of the plurality of third filter coefficients as the first representative coefficient, wherein the position of the first representative coefficient in the plurality of second filter coefficients is the same as the position of the determined first representative coefficient in the plurality of third filter coefficients; and
setting the plurality of third filter coefficients, other than the determined first representative coefficient in the plurality of third filter coefficients, as 0.

8. The method of claim 5, wherein when the absolute value of the second representative coefficient is greater than the product of the absolute value of the first representative coefficient multiplied by the first reference value, the step of generating the plurality of third filter coefficients of the third filter according to the first representative coefficient and the second representative coefficient further comprises:
setting the corresponding coefficient of the plurality of third filter coefficients as the second representative coefficient, wherein the position of the second representative coefficient in the plurality of second filter coefficients is the same as the position of the determined second representative coefficient among the plurality of third filter coefficients; and
setting the plurality of third filter coefficients, other than the determined second representative coefficient in the plurality of third filter coefficients, as 0.

9. The method of claim 4, wherein the step of generating the plurality of third filter coefficients of the third filter according to the first representative coefficient and the second representative coefficient comprises:
summing odd-digit second filter coefficients in the second filter coefficients to obtain an odd-digit sum;
summing even-digit second filter coefficients in the second filter coefficients to obtain an even-digit sum;
subtracting the even-digit sum from the odd-digit sum to obtain an odd-even difference;
summing the absolute values of the plurality of second filter coefficients to obtain an absolute sum;
comparing the odd-even difference, a product of the absolute sum multiplied by a third reference value, and a product of the absolute sum multiplied by a fourth reference value, wherein the third reference value is a positive number less than 1, and the fourth reference value is equal to the third reference value multiplied by −1.

10. The method of claim 9, wherein when the odd-even difference is greater than the product of the absolute sum multiplied by the fourth reference value and is less than the product of the absolute sum multiplied by the third reference value, the step of generating the plurality of third filter coefficients of the third filter according to the first representative coefficient and the second representative coefficient further comprises:
   setting the corresponding two of the plurality of third filter coefficients as the first representative coefficient and the second representative coefficient, wherein the positions of the first representative coefficient and the second representative coefficient in the plurality of second filter coefficients are the same as the positions of the determined first representative coefficient and the determined second representative coefficient in the third filter coefficients; and
   setting the plurality of third filter coefficients, other than the determined first representative coefficient and the determined second representative coefficient of the plurality of third filter coefficients, as 0.

11. The method of claim 9, wherein when the odd-even difference is greater than the product of the absolute sum multiplied by the third reference value, the step of generating the plurality of third filter coefficients of the third filter according to the first representative coefficient and the second representative coefficient further comprises:
   when the first representative coefficient is one of the odd-digit second filter coefficients, setting the corresponding one in the plurality of third filter coefficients as the first representative coefficient, wherein the position of the first representative coefficient in the plurality of second filter coefficients is the same as the position of the determined first representative coefficient in the plurality of third filter coefficients; and
   setting the plurality of third filter coefficients, other than the determined first representative coefficient of the plurality of third filter coefficients, as 0.

12. The method of claim 9, wherein when the odd-even difference is greater than the product of the absolute sum multiplied by the third reference value, the step of generating the plurality of third filter coefficients of the third filter according to the first representative coefficient and the second representative coefficient further comprises:
   when the second representative coefficient is one of the odd-digit second filter coefficients, setting the corresponding one in the plurality of third filter coefficients as the second representative coefficient, wherein the position of the second representative coefficient in the plurality of second filter coefficients is the same as the position of the determined second representative coefficient in the plurality of third filter coefficients; and
   setting the plurality of third filter coefficients, other than the determined second representative coefficient of the plurality of third filter coefficients, as 0.

13. The method of claim 9, wherein when the odd-even difference is less than the product of the absolute sum multiplied by the fourth reference value, the step of generating the plurality of third filter coefficients of the third filter according to the first representative coefficient and the second representative coefficient further comprises:
   when the first representative coefficient is one of the even-digit second filter coefficients, setting the corresponding one in the plurality of third filter coefficients as the first representative coefficient, wherein the position of the first representative coefficient in the plurality of second filter coefficients is the same as the position of the determined first representative coefficient among the plurality of third filter coefficients; and
   setting the plurality of third filter coefficients, other than the determined first representative coefficient of the plurality of third filter coefficients, as 0.

14. The method of claim 9, wherein when the odd-even difference is less than the product of the absolute sum multiplied by the fourth reference value, the step of generating the plurality of third filter coefficients of the third filter according to the first representative coefficient and the second representative coefficient further comprises:
   when the second representative coefficient is one of the even-digit second filter coefficients, setting the corresponding one in the plurality of third filter coefficients as the second representative coefficient, wherein the position of the second representative coefficient in the plurality of second filter coefficients is the same as the position of the determined second representative coefficient in the plurality of third filter coefficients; and
   setting the plurality of third filter coefficients, other than the determined second representative coefficient of the plurality of third filter coefficients, as 0.

15. The method of claim 1, further comprising
   generating an echo cancellation signal according to the plurality of first filter coefficients, wherein the echo cancellation signal is configured to reduce the analog echo signal.

16. The method of claim 1, wherein the digital signal, the fourth signal, the fifth signal, and the second reference signal have a first frequency, and the first signal, the second signal, the third signal, and the first reference signal have a second frequency.

17. The method of claim 16, wherein the second frequency is greater than the first frequency.

18. The method of claim 1, further comprising:
   generating a pseudo-random signal by a pseudo-random number generator, and generating the first reference signal and the second reference signal according to the pseudo-random signal.

19. The method of claim 1, wherein the analog echo signal is a near-end echo.

20. The method of claim 1, wherein the step of updating the plurality of first filter coefficients according to the fifth signal reduces the analog echo signal.

* * * * *